Dec. 28, 1965  R. C. WOLFE  3,225,953
TANK STRUCTURE
Filed May 20, 1963  3 Sheets-Sheet 1
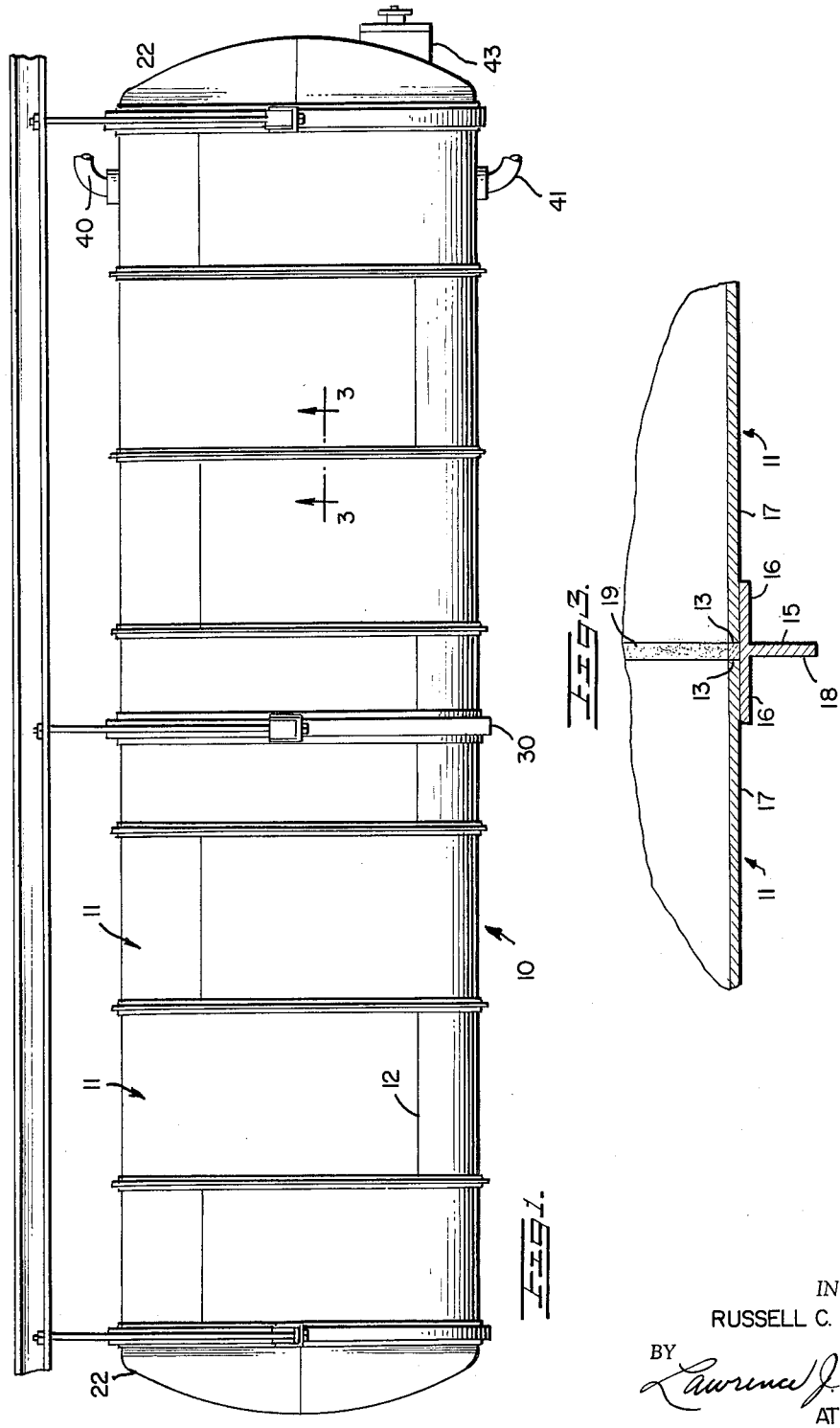
INVENTOR.
RUSSELL C. WOLFE
BY
Lawrence J. Winter
ATTORNEY

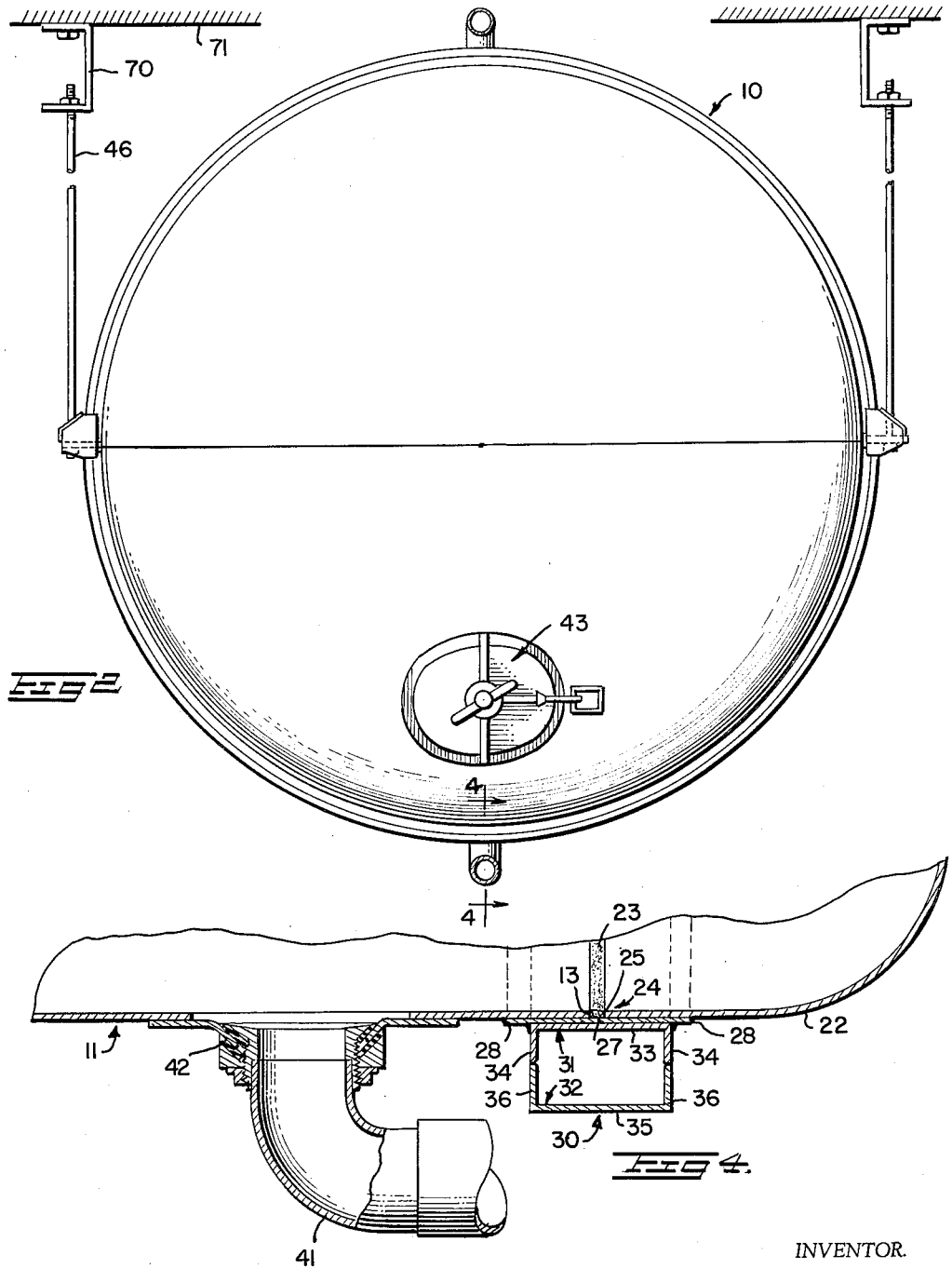

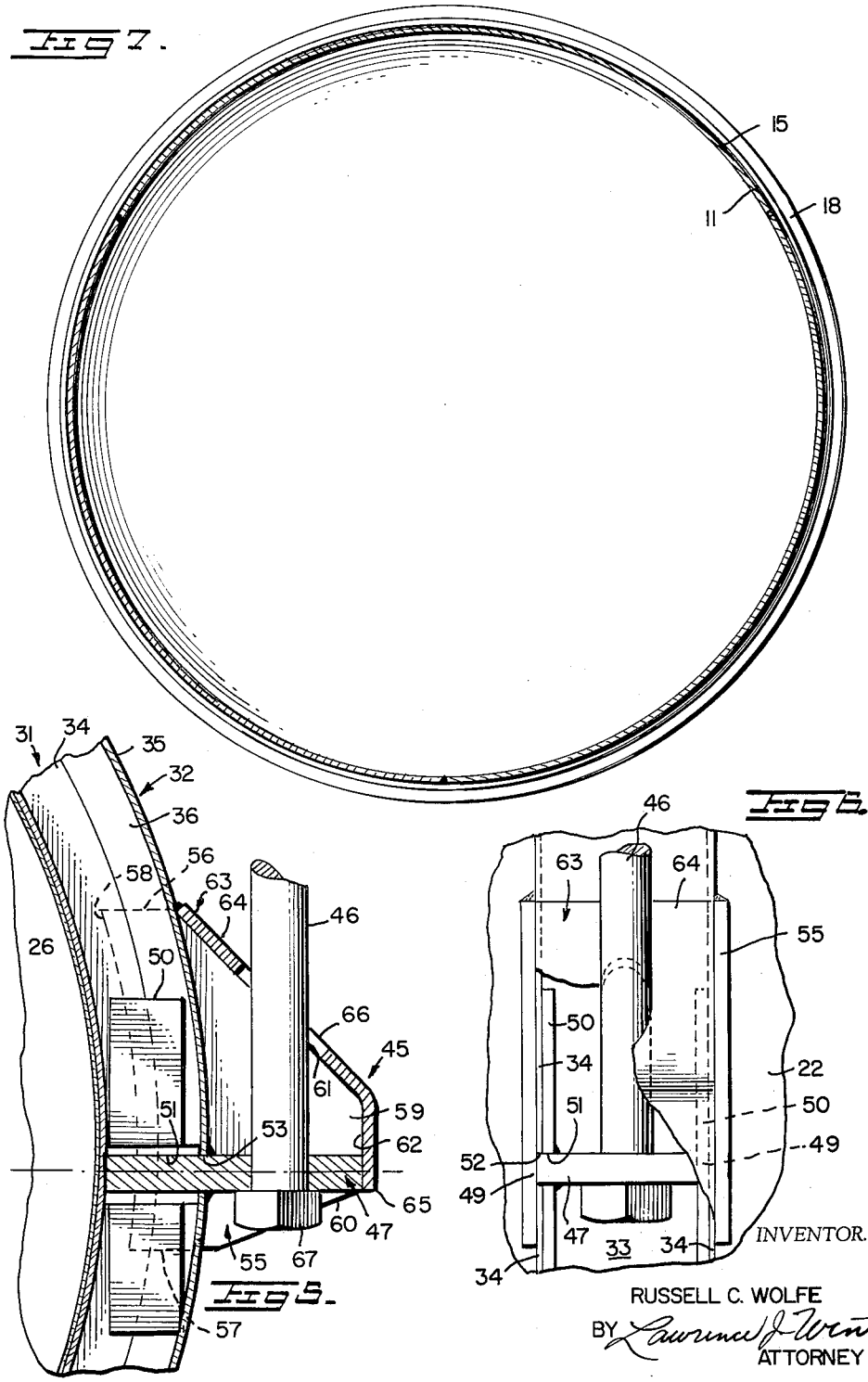

United States Patent Office 3,225,953
Patented Dec. 28, 1965

3,225,953
TANK STRUCTURE
Russell C. Wolfe, Baltimore, Md., assignor to Dixie Manufacturing Company, Inc., Baltimore, Md., a corporation of Maryland
Filed May 20, 1963, Ser. No. 281,611
7 Claims. (Cl. 220—5)

The present invention relates to storage tanks and more particularly to such a tank for use in the brewing industry wherein large quantities of beer are disposed in a fermenting tank.

In the brewing industry it is a common practice to store large quantities of beer, for example, a thousand barrels at a time, within a huge closed tank in order to ferment the beer which takes an appreciable period of time. During this storage for fermenting time the beer within the tank is controlled under predetermined pressure and temperature conditions. The tank is generally substantially filled with beer except for a small space or area adjacent the top of the tank, in order to permit the collection of gasses produced during the fermentation process. The tank is subjected to hydrostatic loads caused by the weight of the liquid therein and is also subjected to stresses due to the gas pressures within.

It is also apparent that the closed tank or vessel for containing the large quantity of beer to be fermented must have an interior surface that is substantially clean and sanitary so as it will not contaminate or in any way cause deleterious effects to the product therein which is eventually to be consumed by human beings. In the past it has been a common practice to line the interiors of these vessels with glass lining to avoid any contamination of the beer therein.

It is also a common practice in tanks of this type to install them permanently on a foundation that is supported on the building floor. As these tanks are very large, for example, they may have a diameter of 12 feet and a length of 43 feet, it is obvious that the disposition of them on a foundation on the floor of the building utilizes an excessive amount of floor space. It is also apparent that the provision of the permanent foundation of the floor of the building adds additional cost to the construction and installation of such a tank.

It is an object of the present invention to provide a substantially large storage tank or vessel for use in the fermentation process necessary in the manufacture of beer which tank is sufficiently strong so as to withstand these stresses due to hydrostatic loads caused by the contained liquid therein and the stresses induced by the resultant gas pressure within the vessel.

It is another object of the present invention to provide a relatively large beer storage tank utilizing a minimum amount of material therein so that the cost of manufacturing the tank is greatly reduced.

It is another object of the present invention to provide a closed beer fermenting tank that is made of stainless steel and has the thickness thereof greatly reduced in comparison to stainless steel tanks manufactured heretofore for containing beer by utilizing novel reinforcement means disposed around the outside of the vessel proper.

It is another object of the present invention to provide a large beer fermenting tank made of stainless steel that is suspended from the roof or overhead structure normally found in a building so as to provide a large amount of floor space that may be utilized for other purposes.

It is another object of the present invention to provide a cylindrical stainless steel tank or vessel for use in beer fermentation processes made up of a plurality of cylindrical sections having a relatively thin thickness joined to one another by shear ring means, mounted at strategic locations spaced longitudinally of the elongated vessel, to prevent the individual sections of the tank from buckling or from becoming deformed due to large stresses from the liquid contained within the tank, and the stresses due to gas pressures within the tank.

It is another object of the present invention to provide a thin wall stainless steel cylindrical tank of elongated length for containing a large number of barrels of beer for fermentation over an appreciable length of time with shear ring means reinforcing the cylindrical sections of the tank at strategic points extending therearound in order to properly strengthen and reinforce the thin wall metal so that the tank roundness is assured.

It is another object of the present invention to provide a large elongated beer tank made of relatively thin sheets of stainless steel formed into cylindrical sections and reinforced adjacent contiguous edges thereof by rings of metal material which rings are disposed in parallel relation to each other and which rings are disposed transversely of the longitudinal axis of the tank.

It is still another object of the present invention to provide a large reinforced thin walled stainless steel vessel for the fermenting of beer therein over long periods of time which tank is provided with ring girder means of relatively stiff cross section disposed at spaced intervals along the longitudinal axis of the tank, and suspension means for hanging the tank from a rafter or beam of a building so that the tank will not utilize any floor space in the building and so that the tank does not require a permanent foundation and can be readily installed and removed from the building.

It is another object of the present invention to provide a cylindrical stainless steel tank made of relatively thin material provided with a plurality of reinforcement ring means disposed at spaced intervals along the longitudinal axis to prevent buckling or deformation of the tank walls, and further provided with a plurality of ring girder means of relatively stiff cross section disposed at strategic points along the longitudinal axis of the tank for detachably connecting thereto suspension means for hanging the tank from a rafter or ceiling of a building.

It is yet another object of the present invention to provide a relatively thin walled cylindrical stainless steel tank with a plurality of shear ring members disposed at strategic locations along the main axis of the tank to reinforce the relatively thin stainless steel wall to prevent the tank from losing its roundness or buckling, and a plurality of ring girder members disposed therealong at other locations for suspending the tank by rod means to the rafters or ceiling of a building so as to keep the minimum cost of manufacture of the tank within allowable limits, by eliminating the necessity for a permanent foundation disposed on the floor of the building, and eliminating the necessity for any type of tank lining and particularly a glass lining which has been widely used heretofore.

It is yet another object of the present invention to provide a thin wall cylindrical elongated stainless steel tank made up of a plurality of individual sections reinforced adjacent their contiguous edges or side edges by shear ring members to prevent buckling of the tank while at the same time providing a plurality of suspension ring girder members for hanging the heavy vessel from a ceiling or beams forming the ceiling and in which the reaction load is applied to the ring girder members at a point outside their neutral axes to give an optimum stress picture in the loaded ring girder members.

It is still another object of the present invention to provide a thin wall stainless steel tank for beer fermentation processes which eliminates the need for glass lining within the tank and the frequent replacement thereof caused by breakage of the glass lining due to vibrations and shock within a manufacturing plant.

In accordance with the present invention a stainless steel vessel is provided made up of a plurality of thin wall stainless steel cylindrical sections having shear ring members secured to and between adjacent cylindrical sections to prevent the tank from losing its roundness and buckling between the shear ring members, and with other box type ring girder members extending around the tank to take the reaction load transmitted to the tank through a plurality of suspension rods connected thereto and supporting the tank on overhead beams usually found in the ceiling of a building.

Various other objects and advantages of the present invention will be readily apparent from the following detailed description when considered in connection with the accompanying drawings forming a part thereof and in which FIG. 1 is a side elevation of the tank embodying the present invention shown suspended from the ceiling or overhead of a building;

FIG. 2 is an end elevation of the tank shown in FIG. 1 on an enlarged scale;

FIG. 3 is a detail view taken along the line 3—3 of FIG. 1 illustrating the shear ring means embodied in the present invention;

FIG. 4 is a fragmentary detail view of the end portion of the tank embodied in the present invention;

FIG. 5 is an enlarged detail view of the ring girder members and suspension means embodied in the present invention for supporting the tank from a ceiling.

FIG. 6 is a view similar to FIG. 5 but looking at the ring girder means from the right side of FIG. 5;

FIG. 7 is a transverse section taken through the tank between two shear ring members.

Referring to the drawings the reference numeral 10 generally designates a large beer containing tank or vessel preferably of a size to contain a substantial number of barrels of beer, for example, a thousand barrels. The tank is substantially cylindrical and has a large diameter, for example a diameter of 12 feet and is relatively long, for example 43 feet in length. The individual sections 11 of the tank are made up of a plurality of thin walled stainless steel plates formed into cylindrical configuration and welded along a seam indicated at 12 extending parallel to the longitudinal axis of the sections. The welded seam 12 is formed by a stainless steel filler rod so that the entire section 12 is composed only of stainless steel material to prevent any contamination or deleterious effect to the beer to be introduced into the finished tank. The thickness of the walls of section 11 are approximately ⅛ inch. Each individual section 11 is secured in a liquid type relationship to the next adjacent section as best shown in FIG. 3, by positioning the adjacent or contiguous edges, ends or side edges 13 of the sections adjacent one another to provide a relatively small or narrow space 14 therebetween and by providing a shear ring 15 adjacent the outer surface or walls of the sections 11 and thereafter welding the pieces together.

The shear ring 15 is substantially T-shaped in configuration with the leg 16 forming the top of the T disposed in contact or abutting relationship with the outer wall 17 of the sections 11, and the vertical leg 18 of the T disposed in alignment with the space 14 between the edges 13 of the sections and extending radially outwardly therefrom. When the pieces have been properly disposed in the above mentioned relationship by any suitable means a bead or seam 19 of stainless steel filler rod is welded to the ends 13 and the inner side of the T shear ring. These shear rings are disposed at spaced intervals along the length of the tank, and the length of the tank is determined by a preselected number of sections 11 desired to be joined or secured together.

The T shear ring members reinforce the thin wall sections 11 and prevent the cylindrical sections from buckling or becoming deformed while utilizing a minimum amount of thickness of stainless steel plates for a given stress or load.

It has been found in actual practice that with a given stress or load due to the hydrostatic load of the beer contained in a vessel and the gas pressure therein in a fermentation process for beer that the thin stainless steel plates can have a thickness of ⅛ of an inch when reinforced with the T-shaped circumferential bands or rings welded completely therearound at the adjoining or contiguous side edges thereof, whereas without such circumferential shear bands the thickness of the stainless steel plate required was approximately ⅜ of an inch for the same given stress or load, for a tank of the same dimensions. Thus, the utilization of the circumferential shear rings permits a great saving in cost in the construction and fabrication of such a tank.

After the desired number of individual cylindrical stainless steel sections have been properly welded to one another to provide the desired length of the tank required the ends of the tanks are closed off by relatively shallow dish shaped beads or closure members 22 welded thereto, as best illustrated in FIG. 4, by a bead or seam 23 of stainless steel filler rod or material. The joint 24 adjacent the closure members 22 is formed by spacing the side edge 25 or end edge of the dome member 22 in spaced relationship from the edge 13 of the end section 11 and by providing a thin backing plate 26 overlapping or extending across the space 27 along which the bead 23 is welded. The backing plate 26 extends continuously around the vessel and has its side edges welded as indicated at 28 to the outer wall of the tank.

A box type ring grider 30 is welded to the outer side of the back up plate 26 to provide means for suspending the tank from an overhead structure by rod means hereinafter described. The ring grider 30 consists of two C-channel members 31 and 32 with the inner C-ring 31 having its web 33 disposed against the plate 26 and with its toes, flanges or legs 34 extending radially outwardly therefrom with the outer C-channel 32 having its web 35 disposed opposite the web 33 and its legs or flanges 36 abutting the corresponding flanges 34 of the first mentioned C-channel and welded toe to toe thereto so as to form the box girder.

The tank is provided with three of the ring girders extending completely around the outer wall of the vessel with one ring grider disposed adjacent the joint of the closure member 22 at one end section 11 of the tank, the other at the opposite end of the tank and one disposed at the mid point or central portion of the tank so as to provide six points of suspension for the tank. The tank is provided with a filler pipe or connection 40 in the top thereof and a discharge pipe or connection 41 in the bottom of the tank. The discharge connection 41 is properly secured by a connection 42 in a suitable manner as best shown in FIG. 4 by welding connection 42 adjacent a discharge port or opening in the bottom of the tank. A manhole 43 is disposed in one of the closure members 22 for access to the interior of the tank.

The tank is provided with suspension means generally designated 45 for connecting elongated rod 46 to the tank to properly suspend it from an overhead structure. The suspension means are provided with a horizontally extending relatively thick rectangular suspension plate member 47 welded to the C-channels adjacent the center line 48 extending transversely of the tank. The legs 34 and 36 and the web 35 of the C-channels are provided with horizontally extending cut outs or slots to receive the suspension plate member 47 therethrough. Disposed adjacent the inner side or face of each channel leg 34 and each channel leg 36 of the outer C-channel is a vertical reinforcement plate member 50 as best seen in FIGS. 5 and 6. The reinforcement plate members 50 are welded to the inner side of the channel legs 34 and 36 so that they are perpendicular to axis 48 of the tank, are disposed adjacent the center line 48 so that they extend a substantial distance above and below it. The reinforcement plate members 50 are provided with horizontally extending slots 51 through which the suspension plate 47 extends. The slots 51 formed in the reinforcement plate 50 are in alignment with the slots 52 formed in the legs 34 and 36 of the channel members and the outer C-channel slot 53.

The opposite side edges or faces 49 of the reinforcement plate 47 are welded to gusset plate members 55. The gusset plate members are vertically disposed adjacent the outer faces of the legs 34 and 36 of the channel members to which they are welded and are disposed horizontally adjacent the tank transverse center line 48 as best seen in FIGS. 5 and 6, with the upper end 56 of the gusset plate extending substantially above the upper end of the reinforcement plates 50 and the lower end 57 of the gusset plate extending substantially above the lower end of the reinforcement plates and substantially below the bottom of the suspension plate member 47. The inner end 58 of gusset plate is arcuate and is disposed inwardly of the abutting edges of the toes of the C-channels. The outer portion 59 of the gusset plate extends substantially beyond the web 35 of the outer C channel member. The outer portion 59 of the plate members have an upwardly inclined bottom edge 60 and a downwardly inclined top edge 61 with a vertical outer edge 62 therebetween. A top of cover plate 63 is provided having an inclined upper portion 64 welded to the gusset plates and web 35, a lower vertical portion 65 welded to the outer edge of the suspension plate 47, and cover plate 63 is provided with an enlarged opening 66 in the upper portion 64 thereof through which the suspension rods 46 extends. The suspension rod 46 has its lower end provided with a threaded nut 67 and extends through an opening or aperture in the outer portion of the reinforcement plate 47. The upper ends of the rods 46 are secured to overhead C-channel beams or members 70 secured by any suitable means such as bolts to the ceiling structure or roof 71.

It is to be noted that the suspension rods 46 are secured to the reinforcement plates 47 so that reaction load is carried through the ring girders at points outside of the neutral axes, i.e., the point where the toes of the channel members abut and at a relatively stiff cross section provided therein.

Thus, from the foregoing description it is apparent that the present invention provides a relatively thin wall stainless steel tank made up of a plurality of individual cylindrical sections, reinforced by shear ring members at spaced long intervals along the longitudinal axis of the tank, so as to prevent buckling of the thin wall sections, and relatively stiff cross sectional ring girders at points along the tank where it is to be suspended from a overhead structure, with novel suspension means for taking the load applied to the ring girders at a point outside its neutral axis to provide an economical tank for containing large quantities of beer for fermentation processes.

The present invention also provides a thin wall stainless steel cylindrical tank carrying large quantities of beer which tank can be readily suspended from an overhead structure and thereby eliminate the requirement of a large floor space area, and further eliminate the requirement for providing a permanent type base or foundation for supporting the tank as used heretofore, and which tank eliminates the need for glass lining to prevent contamination of the beer therein and thereby greatly reduces the maintenance cost of such a tank due to breakage of the glass lining attendant heretofore because of vibrations and the like in the plant where the beer was being fermented.

Inasmuch as various changes may be made in the form, location and relative arrangement of the several parts without departing from the essential characteristics of the invention, it will be understood that the invention is not to be limited except by the scope of the appended claims.

What is claimed is:

1. A thin walled stainless steel tank for containing beer therein comprising a plurality of substantially cylindrical sections, said sections being disposed in longitudinal alignment with each other to form an elongated cylindrical tank, adjacent ends of said sections being positioned from each other to form circumferential spaces therebetween, a shear ring member disposed adjacent each space and overlapping the outer surfaces of said adjacent ends, a bead of stainless steel welding material deposited in each space and securing the overlapping ring member and adjacent section ends to each other in a liquid tight relationship, the sections disposed at opposite ends of said tank being provided with closure members secured thereto, suspension means secured to said tank at spaced intervals therealong for suspending the tank from an overhead structure including ring girder members extending around said sections, and rod means secured to said girder members for transmitting the reaction load thereto, said rod means being secured to said girder members outside of the neutral axis of said girder members, said ring girder members being two C channel members welded together to form a box structure, said means secured to the ring girder member comprising vertical reinforcement plates secured to the inner faces of the flanges of said C channel members, said reinforcement plates and C channel members being provided with horizontal slots adjacent the center line of said tank, a horizontal suspension plate having its inner end disposed in said slots and its outer end extending beyond the outer face of said C channel members welded to said C channel members and said reinforcement plates, gusset plates secured to the outer faces of the flanges of said C channel members in alignment with said reinforcement plates, and a cover plate secured to said gusset plates and suspension plate, and aperture means provided in said suspension and cover plate beyond the outer surface of said C channel members.

2. The tank of claim 1 wherein a rod member extends through said aperture means and is secured to said suspension plate.

3. The tank of claim 1 wherein said means are secured to a ring girder member on opposite sides of said tank.

4. A thin wall elongated closed stainless steel tank for containing beer for a fermentation process comprising a plurality of substantially cylindrical sections, and said sections being disposed in longitudinal alignment with each other, contiguous edges of said sections being spaced apart, a substantially T shape shear ring member extending around adjacent sections and covering the space therebetween, a stainless steel bead of filler material disposed in said space and securing the contiguous edges and section to the T shape to prevent buckling of the thin wall sections due to the hydrostatic load of the beer and gas pressures in the tank, the bottom of the T ring member extending radially outwardly and disposed in alignment with said space the sections forming the opposite ends of the tank being closed off by end closure members, a plurality of ring girder members extending around said tank at spaced longitudinal intervals comprising two C channels facing inwardly and outwardly respectively and welded toe to toe to each other to provide a box girder, two vertical reinforcement plates welded to the inside faces of said toes and overlapping the toes of both C channels, horizontal slot means provided in the toes of both C channels and the web of the outer C channel and in said reinforcement means at a point adjacent the center line of the tank, a thick horizontal suspension plate having its inner end disposed in said slot means and its outer end extending a substantial distance beyond the web of said outer C channel and secured to said C channels and reinforcement plates, vertical gusset plates secured to the outer toes of said C channels and suspension plates, a cover plate having an upper inclined portion secured to the web of said outer C channel and to the upper portion of said gusset plates and a lower vertical portion secured to the outer edge of said suspension plate, aperture means provided in the upper portion of said cover plate and the outer portion of said suspension plate in alignment with each other, rod means extending through said aperture means and secured to said suspension plate whereby said tank can be suspended from an overhead structure and takes a reaction load beyond the neutral axis of said girder member.

5. The tank of claim 4 wherein said tank is provided with at least three girder members disposed in alternate spaced relationship with said T members, and said suspension, reinforcement, gusset and cover plates are provided on oppositely disposed sides of a girder member.

6. A thin walled elongated large closed stainless steel tank for suspension from an overhead support for holding liquid therein comprising a plurality of substantially cylindrical thin walled sections disposed in lateral horizontal alignment with each other to form a large elongated horizontal tank, adjacent sections being disposed apart to provide a circumferential space therebetween, a substantially T shape shear ring member extending completely around the circumference of adjacent sections and covering the circumferential space between the sections, with the cross bar of the T being disposed inwardly and bearing against the outer surface of said cylindrical sections and covering the circumferential space therebetween, a stainless steel bead of filler material disposed in said circumferential space securing contiguous edges of the sections to the T shaped member to prevent the individual sections from buckling and becoming deformed due to the hydrostatic load of liquid and gas pressure within the tank, the base of the T shape member being in radial alignment with said space and extending away from said space, the sections forming the opposite ends of said tank being closed off by end closure members, a plurality of hollow girder members of a box shape cross section extending circumferentially completely around said tank, said girder members having a diameter substantially larger than the diameter of said cylindrical sections, said neutral axis of said girder members being positioned radially outwardly of said cylindrical sections, and rod members located radially outwardly of said neutral axis of said girder member and connected to said girder member to carry the reaction load of the tank and its contents, said rod members being secured to said ring girder member on opposite sides of said tank and adjacent the central axis of said tank.

7. The tank of claim 6 wherein said tank is provided with girder members adjacent its opposite ends and center portion.

References Cited by the Examiner
UNITED STATES PATENTS

| | | |
|---|---|---|
| 1,247,884 | 10/1917 | Rist. |
| 1,779,564 | 10/1930 | Slagel. |
| 2,124,441 | 7/1941 | Thwaits _____ 220—5 |
| 2,395,685 | 2/1946 | Schmitz _____ 220—5 |
| 2,684,170 | 7/1954 | Schmitz _____ 220—5 |

THERON E. CONDON, *Primary Examiner.*

GEORGE E. LOWRANCE, *Examiner.*